United States Patent Office 3,454,898
Patented July 8, 1969

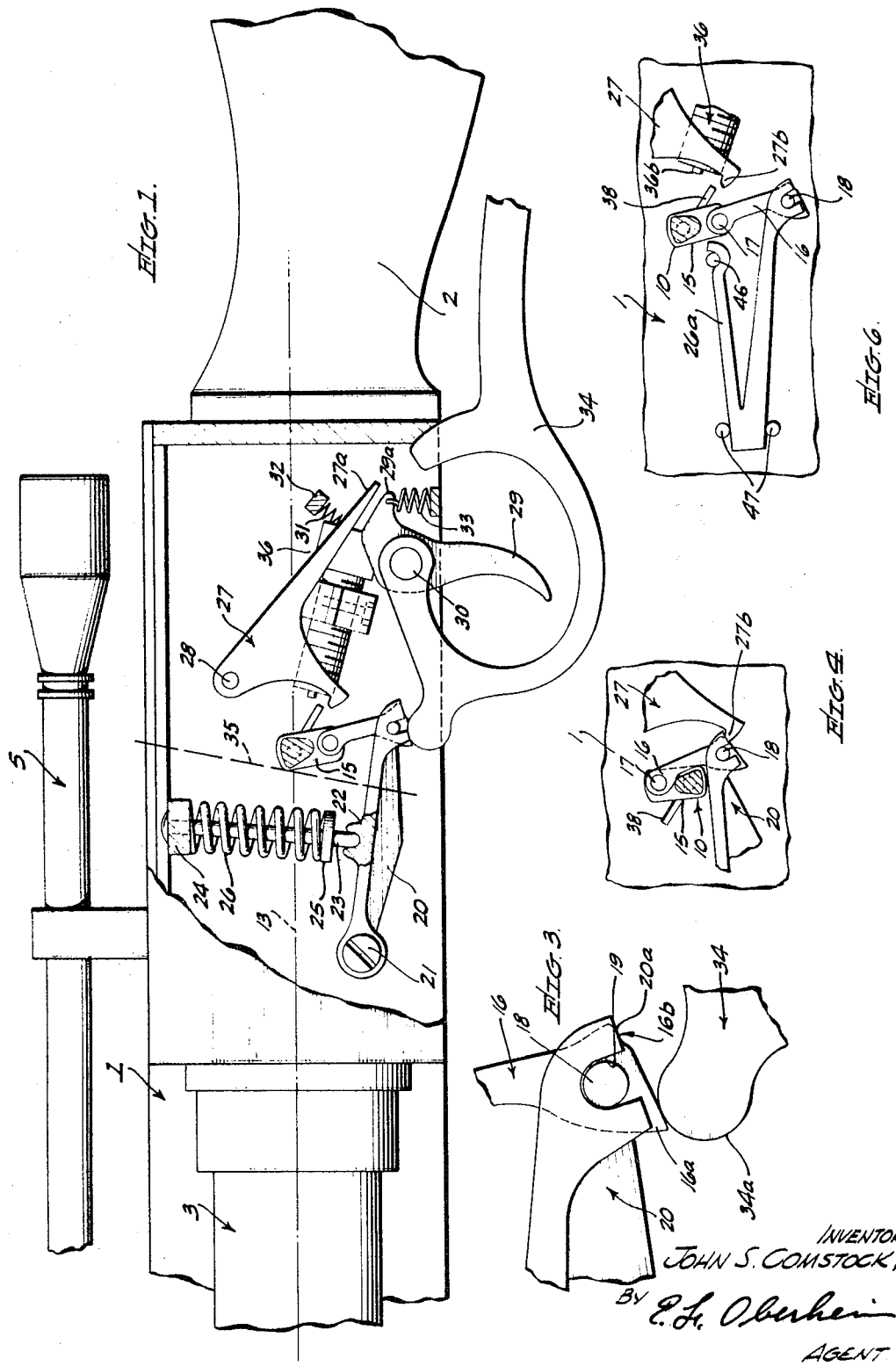

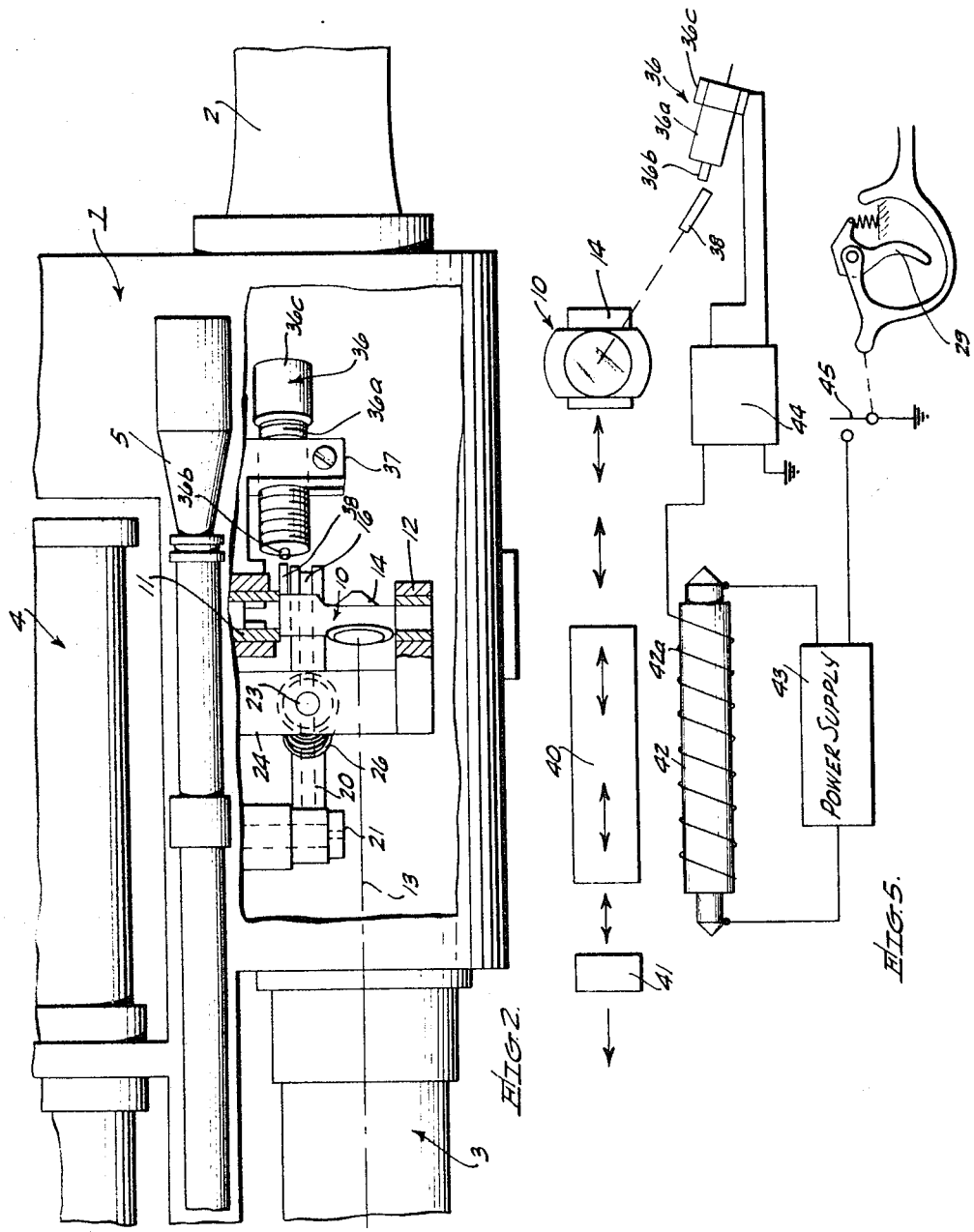

3,454,898
TRIGGERING MECHANISM FOR HIGH SPEED LASER SWITCHING
John S. Comstock, Playa del Rey, Calif., assignor to Hughes Aircraft Company, Culver City, Calif., a corporation of Delaware
Filed Mar. 16, 1964, Ser. No. 352,152
Int. Cl. H01s 3/10
U.S. Cl. 331—94.5                                6 Claims

ABSTRACT OF THE DISCLOSURE

A high-speed mechanical Q switch for a pulsed laser wherein a reflecting member is rotated from a non-reflecting position to a reflecting position to establish a feedback path in a laser cavity. A spring driven rotor in which the reflecting member is mounted provides the high angular velocities desired for Q-switching operation. A non-contacting magnetic pulse generator coupled to the rotor provides the pulse necessary to initiate laser pumping.

---

This invention relates generally to laser apparatus, and more particularly to a triggering mechanism which synchronizes laser pumping with high speed mechanical optical switching to produce high energy laser output pulses.

Such laser apparatus is useful in detect and ranging applications. When so employed, a counter driven by a precision oscillator is enabled when the light pulse is transmitted and is stopped when the reflected light pulse is received. The oscillator, whose frequency of oscillation may correspond to increments of feet, yards or meters, thus stores in the counter a coded number corresponding to the range measured. This information, when applied to appropriate decoding networks, may be numerically presented by such numerical display devices as nixie tubes.

Manual portability of such laser apparatus requires a self-contained unit which is compact, which includes its own power supplies and which is sufficiently light to permit manual transporting and use.

The operation of a laser apparatus for producing high energy pulses for this and other purposes requires a facility for switching the laser cavity or cell between reflective and nonreflective conditions. In the nonreflective condition there is no optical feedback and, hence, no optical resonance. This raises the laser threshold above that normally associated with classical laser action so that considerably more than the normal amount of energy is stored within the laser material without laser action occurring. If no reflectivity is established in the laser cavity the optical feedback path is restored and the laser is well above the energy threshold for laser action. The excess energy stored within the laser material is consequently emitted in a short, extremely high power pulse. Pulse durations of less than 10 nanoseconds with peak powers of the order of 100 megowatts have been observed, using ruby laser material. The reference to ruby laser material is illustrative. Other types may be employed.

High speed switching action requires an element controlling the optical feedback path in laser cavities to produce single pulses of greater power. By analogy to electromagnetic devices the reflective properties of the laser cavity are related to inductance. Hence, the term "Q" is applied to the reflecting conditions of the laser cavity and the term "Q" switch and "Q" switching are commonly employed to denote optical switching elements controlling laser action and the act of completing the laser cavity feedback path, respectively.

There are several types of optical switches or "Q" switches. Some of these, such as the Kerr and Pockel cells, control laser cell or cavity reflectivity by rotating the plane of polarized light from a light polarizing prism so that it returns with its plane of polarization rotated 90° with respect to the acceptance plane of the prism, thus cutting off the passage of light. The speed of operation of the Kerr and Pockel cells is limited only by the speed with which the voltage across the cell plates can be changed. With careful design, for example, the Kerr cell can be switched in well under 10 nanoseconds.

Although the Kerr and Pockel cells offer high speed switching, environmental difficulties with the bi-refringent materials and the relatively high voltages required for operation are aspects which are relatively incompatible in equipment which is to be easily, manually transported and used.

Others of these optical or "Q" switches control laser action by rotating devices having reflecting surfaces. One of these uses a motor for driving a rotating reflector. The chief disadvantage of this technique is the requirement for a high speed motor which leads to a relatively long start-up time, to susceptibility to shock and to dust particle contamination, and to additional battery drain.

Another type mounts a rotatable reflector on a torque rod. Mechanical stresses in the torque rod are impractically high to achieve the required angular velocity of the mirror, resulting in fatigue failure.

One object of this invention is to provide an improved high speed trigger mechanism which synchronizes laser pumping with high speed optical switching.

Another object of this invention is to provide an improved trigger mechanism of the character aforesaid which is mechanically and electrically simple and durable.

A specific object of this invention is to provide a high speed trigger mechanism for rotating a reflector forming part of a laser cell, which requires only manual effort for operation.

The aforesaid and other objects and advantages are accomplished in a spring energized laser triggering device embodying the principles of this invention which employs a rotor mounting a reflector for rapid movement from a non-reflecting position through a reflecting position with respect to a laser cell. The rotor is coupled to a spring-loaded rotor driving linkage operable between cocked and released positions, in which the spring is preloaded, so that the ratio of spring force to spring mass and linkage mass that must be set in motion is high not only in cocked position but also in the tripped or released position.

A cocking mechanism engages and collapses the rotor driving linkage against the spring force and moves the rotor driving linkage to cocked position in which a sear on the linkage engages and is held by a suitable catch member on a trigger mechanism.

The rotor may also mount a movable armature forming part of an electromagnetic transducer for producing a triggering pulse to operate a flash tube and initiate laser pumping action upon release of the rotor from cocked position. The relationship of the armature to the core of the electromagnetic transducer is pre-set to initiate pumping of the laser cell sufficiently in advance of movement of the reflector to optical switching position with respect to the laser cell to permit high energy storage in the laser cell.

When the trigger mechanism is operated the catch releases the sear. The rotor-driving linkage under spring pressure rotates the rotor and the reflector thereon at high velocity equivalent to about 30,000 r.p.m. at the point where the reflector initiates laser action. The energy of the moving system is then given up as work done overcoming friction in the connections among the moving parts. Oscillation ceases after several cycles.

In view of the high velocity of the reflector as it moves into a position to optically switch the laser cell, the bulk of the stored energy in the laser cell is given up in the production of a single high energy light pulse whose duration is typically 20 nanoseconds. Thus, the period of oscillations of the reflector through the optical axis being orders of magnitude slower than the time required for laser action, any subsequent swings of the rotor are incapable of producing any further laser action.

Other objects and advantages will become apparent from a study of the following specifications when considered in conjunction with the accompanying drawings in which:

FIG. 1 is a side elevational view, fragmentarily in section, illustrating one embodiment of this invention in a coherent light ranging and detecting device;

FIG. 2 is a top plan view fragmentarily in section of the arrangement illustrated in FIG. 1;

FIG. 3 is an enlarged detail of a portion of the rotor driving linkage of the trigger mechanism of this invention;

FIG. 4 illustrates the rotor driving linkage in cocked position;

FIG. 5 schematically illustrates the laser switching system of this invention; and FIG. 6 illustrates a modification of the rotor driving linkage.

The drawings herein illustrate this invention as embodied in a coherent light detection and ranging device which is manually transportable. The ranging device is very generally of the configuration of a rifle and is conventionally cocked, sighted and triggered. It comprises a main frame 1 having a stock 2. The main frame 1 mounts a laser transmitter 3, a photodetector receiver 4 and an optical sight 5. The transmitter 3 includes a laser transmitter and associated recollimating optics which are described at a later point, in part, in connection with FIG. 5. The receiver includes a photodetector, a narrow band optical filter, conventional receiver optics and a power supply for the photodetector. Inasmuch as these details form no part of this invention they are not illustrated in the interest of simplicity. A portable power pack, not shown, includes such items as a battery, a flash tube modulator, a power inverter and digital counters used in ranging circuits associated with the ranging device. Such details do not form a part of this invention and have not been illustrated. In practice a flexible cable, not shown, couples this power back to the ranging device.

In operation the ranging device is cocked, sighted on the target and then triggered or "fired." The counters count at a constant rate during the interval from pulse transmittal to receiving of the reflected pulse and exhibit a decimal number representing distance in meters or feet, for example.

Precise control of the timing of the above operations, together with precise control of optical or "Q" switching of the laser cavity, is provided by a laser trigger mechanism which comprises a rotor 10 having its ends journalled in suitable bearings 11 and 12. The axis of rotation of the rotor 10 is normally disposed with respect to the optical axis of the transmitter 3 as indicated by the dot-dash line 13. The rotor 10 is provided with a cavity receiving and securely mounting a roof prism, generally designated 14, the front of which is optically flat and the back of which is provided with two optically flat faces occupying positions of 90° with respect to one another and equally displaced about 45° from the optical axis, approximately as shown in FIG. 2, and defining an edge at the intersection of the optically flat faces which lies in a plane normal to the plane of the paper.

This rotor is controlled for movement between cocked and released positions by means of a linkage which includes a crank 15 secured to and radially extending from the rotor body. The lower end of the crank 15, as seen in FIG. 1, typically engages a link 16 at its upper end. The crank 15 may be bifurcated to straddle the end of the link 16. A pin 17 provides the pivotal connection. A pin 18 (see FIG. 3) in the lower end of the link 16 receives notches 19 in the bifurcated end of a spring loaded lever 20, the opposite end of which is pivotally mounted by means of a mounting pin 21 to the main frame 1. A detent 22 approximately centrally of the upper side of the lever 20 receives the bottom end of a spring supporting pin 23, the upper end of which slidably extends through a hole in a bracket 24. A spring seat 25 is secured to the pin 23 adjacent its lower end as shown. A compression spring 26 is compressed between the bracket 24 and the spring seat 25, thereby spring loading the spring lever 20 in a direction to move the rotor driving linkage to its released position as shown.

The laser trigger mechanism includes additionally a trigger lever 27 which is pivotally mounted to the main frame 1 by means of a pin 28 as shown. The trigger lever 27 is provided with an extension 27a disposed adjacent an actuating extension 29a of a trigger 29 which is pivotally mounted to the main frame 1 by means of a trigger pin 30. A compression spring 31 is compressed between the trigger lever extension 27a and a spring retainer bracket 32 secured to the main frame 1 normally biasing the trigger lever 27 in a clockwise direction as viewed in FIG. 1. The trigger 29 is biased in a clockwise direction as viewed in FIG. 1 by means of a tension spring 33, one end of which is anchored to the main frame 1 and the other end of which is anchored to the actuating extension 29a which biases the trigger in a clockwise direction against its mechanical stops (not shown).

A cocking lever 34 is pivotally mounted about the trigger pin 30 and is provided with a cocking extension 34a which engages the bottom end of the link 16 of the rotor driving linkage. As will be seen in enlarged detail in FIG. 3, the bottom end of the link 16 has a link extension 16a extending to the left, as viewed, of the pin 18. Cocking extension 34a of the cocking lever 34 bears upon the bottom face of this extension at a point to the left of the pin 18. Whenever the rotor driving linkage is released it occupies the position illustrated in FIG. 1 in which the axes of the rotor bearings and the pins 17 and 18 occupy positions defining a straight line through the linkage. When it is desired to cock the mechanism it is necessary to break this straight line relationship. This is accomplished in the instant case by applying the cocking force to the left of the pin 18 of the link 16. When the cocking force is applied the spring force is taken up by the cocking lever which tends to unload the rotor driving linkage. In this condition the link 16 tends to rotate clockwise about its pin 18 bearing in the notches 19 in the end of the spring loaded lever 20. In this relatively unloaded condition of the linkage this rotates the crank 15 in a counter-clockwise direction whence continued movement of the cocking lever completely collapses the rotor driving linkage rotating the rotor something less than 180° to the cocked position of the rotor driving linkage. FIG. 4 fragmentarily illustrates the essential elements of the rotor driving linkage and the trigger lever 27 to illustrate the relative positions of the several elements when the linkage is in cocked position. In cocked position the extremities 20a of the spring loaded lever 20 functioning as sears in this trigger mechanism engage a catch 27b on the trigger lever 27 which is spring loaded by the spring 31. An extension 16b of link 16 has a lower edge approximately conforming to the extremities 20a of lever 20 so that the link 16 is at least loosely captured by the catch 27b. Thus, the spring loaded lever and the rotor driving linkage are held in cocked position.

When the trigger 29 is pulled the catch 27b releases the sears and the rotor driving linkage is quickly returned to the released position shown in FIG. 1 by the spring 26. The broken line illustrates the approximate angle of the front face of the roof prism 14 when the rotor linkage is in released position. At such time as the rotor driving linkage is cocked the face of this mirror is rotated counterclockwise to a position in which its face is directed away from the optical axis 13 of the transmitter 3. Whenever the trigger is pulled to trip the rotor driving linkage the rotor rotates back to its released position. In so doing the optical axis of the roof prism sweeps through a position of coincidence with the optical axis 13 of the transmitter 3. Assuming that the laser cell at the transmitter 3 has been suitably pumped or excited, optical switching takes place producing the high energy coherent light pulse described above. The prism continues through this point at which laser action occurs and oscillates about that position of the front face thereof represented by the broken line 35. As stated above, during the succeeding sweeps or oscillations of the rotor, which are exceedingly slow with respect to the time required for laser action to occur, through the position at which laser action has occurred, further laser action will not occur inasmuch as the energy has been fully dissipated during the 20 nanosecond interval characteristic of "Q" switched laser operation with this device.

Provision for synchronizing the electrical control of the light source in the laser cell with optical switching provided by rotation of the optical axis of the prism through the optical axis 13 of the transmitter is provided by means of an electromagnetic transducer, or equivalent pickoff device, generally designated 36. This transducer comprises an externally threaded body portion 36a threadably received and clamped by means of a clamp 37 supported upon the main frame 1. The electromagnetic transducer 36 used herein as an example of the type of pickoff that might be employed comprises a magnetic core having an end 36b which confronts the end of a pin 38 of magnetic material projecting radially from the rotor 10 as the latter rotates from cocked to the released position shown. The electromagnetic transducer additionally includes a coil 36c which links the core 36b and which, as will be described, is coupled to a conventional trigger circuit for the purpose of controlling operation of the flash tube which pumps the laser material. The angular position of the pin 38 on the rotor 10 controls the precise instant in time at which flash tube triggering takes place to provide optimum pumping of the laser material prior to the occurrence of coincidence of the optical axis of the prism with the optical axis of the transmitter 3.

As will be seen from an inspection of FIGS. 1 and 2, the mass of the linkage system and the spring which must be moved by spring force may be kept relatively small in relation to spring force by reason of the design configuration of this arrangement whence it is possible to provide relatively high spring forces to achieve high angular velocities of prism or reflector rotation as required for extremely high energy pulse generation. With an arrangement of this type angular or rotational rates as high as 30,000 r.p.m. are achievable at the time the prism optical axis sweeps through coincidence with the optical axis of the laser transmitter. Under these conditions the laser energy is dumped in a single high energy pulse.

FIG. 5 illustrates the essential elements for producing laser action. As illustrated, a ruby rod 40 is disposed along an optical axis with a multilayer dielectric coated optical flat 41 and the prism 14 mounted in the rotor 10 as desecribed. The rotor 10 is shown in a position in which the optical axis of the prism is in approximate alignment with the optical axis of the ruby rod and the optical flat 41. Pumping of the ruby laser is provided by means of a conventional xenon flash tube 42 having a linear arc length of about 2 inches. While not illustrated herein, a pump reflector normally will be provided. One such pump reflector may be a highly polished aluminum elliptical cylinder. A power supply network represented only as a block designated 43 provides a nearly rectangular pulse which is utilized to supply energy to the flash tube 42 through the circuit connections shown. A control electrode 42a in the flash tube triggers the flash tube to initiate pumping of the ruby rod 40. Timing of the initiation of the pumping action is provided by means of a conventional trigger circuit 44 which is by is positioned so that it sweeps past the end 36b of the electromagnetic transducer. As will be receealled, the pin 38 which is mounted on the rotor 10 and controlled there-by is posttioned so that it sweeps past the end 36b of the core of the transducer sufficiently in advance of the occurrence of optical switching of the laser that the flash tube might pump the laser to an optimum level above threshold. Before triggering takes place a switch 45, actuated for convenience by the cocking action, initiates operation of the power supply 43 to supply energy to flash tube 42. Thereafter, when the pin 38 sweeps past the end 36b of the core of the transducer the triggering circuit 44 couples a high voltage signal to the control electrode 42a of the flash tube 42 to break down flash tube resistance, allowing the available energy in the power supply 43 to flow to initiate pumping action. Thereafter, optical switching takes place to generate the high energy coherent light pulse.

A variation of the spring loading arrangement providing lower mass in the spring loading system is illustrated in FIG. 6 wherein a two-legged cantilever spring arrangement 26a is illustrated. One leg is provided with a slotted extremity which engages pin 18 at the lower end of link 16. The other end is provided with a hooked extremity which engages a pin 46 which is supported by the main frame. The end of the cantilever spring opposite the two extremities may be secured in any convenient manner to main frame 1 to permit slight rotation and translation if necessary. In this respect pins 47 disposed on opposite sides of this left end of the cantilever spring provide the type of restraint which is required.

Although two embodiments of spring coupling arrangements have been shown herein, it will be appreciated by those skilled in the art that other arrangements for coupling spring bias to the linkage assembly illustrated may be incorporated herein and that variations in the configuration of elements of the linkages and in specific organization of elements of the linkages also may be made without departing from the spirit and scope of this invention. Accordingly, it is intended that the foregoing disclosure and the illustrations of the drawings are to be considered only as illustrative of the principles of this invention and not construed in a limiting sense.

What is claimed is:

1. In combination with a Q-switched laser of the type having a rotatable reflecting member which forms one end of a laser cavity, a rotor for mounting said reflecting member for rotational motion about an axis which is substantially normal to the axis of said cavity, rotor driving means for rotating said rotor from a cocked position to a released position, cocking means engageable with said rotor driving means for restoring said rotor to said cocked position from said released position, trigger means engaging and holding said rotor driving means in said cocked position, said trigger means being adapted for pivotal motion to relase said rotor from said cocked position, the optical axis of said reflecting member in said cocked position being displaced from the optical axis of said cavity, said reflecting member being aligned in said rotor whereby said optical axis of said reflecting member sweeps through said optical axis of said cavity during the transit of said rotor from said cocked position to said released position, the improvement which comprises:

rotor driving means which includes a crank coupled to said rotor, a link pivotally coupled to said crank, resilient means coupled to said link to bias said rotor to said released position in which said crank and link are extended, and magnetically actuated pulse generating means coupled to said rotor and responsive to a predetermined angular displacement of said rotor.

2. Apparatus as set forth in claim 1 wherein said cocking means engages said link at a point displaced from the point of pivotal coupling of said link with said crank.

3. Apparatus as set forth in claim 1 wherein the axis of rotation of said rotor, the axis of pivotal coupling of said crank and said link, and the point of coupling of said resilient means to said link occupy positions in substantially a straight line when said rotor is in said released position.

4. Apparatus as set forth in claim 1 wherein the axis of rotation of said rotor, the axis of pivotal coupling of said crank and said link, and the point of coupling of said resilient means to said link, occupy positions in substantially a straight line when said rotor is in said released position, and wherein said cocking means engages said link on one side thereof displaced from said straight line.

5. Apparatus as set forth in claim 1 wherein the axis of rotation of said rotor, the axis of pivotal coupling of said crank and said link, and the point of coupling of said resilient means to said link, occupy positions in substantially a straight line when said rotor is in said released position, and wherein said cocking means engages said link on one end thereof in a position transversely displaced from said point of coupling of said resilient means to said link.

6. Apparatus as set forth in claim 1 wherein the axis of rotation of said rotor, the axis of pivotal coupling of said crank and said link, and the point of coupling of said resilient means to said link, occupy positions in substantially a straight line when said rotor is in said released position, said link having a lateral extension on the end thereof opposite the point of pivotal coupling of said link and said crank, and wherein said cocking means engages said link at said one end thereof on said lateral extension.

References Cited
UNITED STATES PATENTS

| | | | |
|---|---|---|---|
| 580,679 | 4/1897 | Davenport | 42—19 |
| 3,308,396 | 3/1967 | Comstock et al. | 331—94.5 |

RONALD L. WIBERT, *Primary Examiner.*

E. BAUER, *Assistant Examiner.*

UNITED STATES PATENT OFFICE
CERTIFICATE OF CORRECTION

Patent No. 3,454,898                                            July 8, 1969

John S. Comstock

It is certified that error appears in the above identified patent and that said Letters Patent are hereby corrected as shown below:

Column 3, line 6, "folowing" should read -- following --. Column 5, line 57, "desecribed" should read -- described --; line 71, cancel "Timing of the initiation of the pumping action is provided by means of a conventional trigger circuit 44 which is by is positioned so that it sweeps past the end 36b of the electromagnetic transducer." and insert -- Timing of the initiation of the pumping action is provided by means of a conventional trigger circuit 44 which is controlled by the electrical output of the coil 36c of the electromagnetic transducer. --; line 74, "recealled" should read -- recalled --. Column 6, line 53, "relase" should read -- release --.

Signed and sealed this 24th day of March 1970.

(SEAL)
Attest:

EDWARD M. FLETCHER, JR.                        WILLIAM E. SCHUYLER, JR.
Attesting Officer                                   Commissioner of Patents